United States Patent [19]
Noda et al.
[11] Patent Number: 4,675,762
[45] Date of Patent: Jun. 23, 1987

[54] DISK LOADING AND CLAMPING MECHANISM FOR A DATA TRANSFER APPARATUS

[75] Inventors: Yasushi Noda, Tokyo; Kazuhiko Shiroyama, Musashino, both of Japan

[73] Assignee: Teac Corporation, Tokyo, Japan

[21] Appl. No.: 634,319

[22] Filed: Jul. 25, 1984

[30] Foreign Application Priority Data

Jul. 29, 1983 [JP] Japan ............................... 58-139696

[51] Int. Cl.[4] ............................................ G11B 5/012

[52] U.S. Cl. ...................................... 360/97; 369/261; 360/99

[58] Field of Search ....................... 360/97, 98, 99, 86, 360/133; 369/261, 270, 271

[56] References Cited

U.S. PATENT DOCUMENTS

| | | | |
|---|---|---|---|
| 4,040,107 | 8/1977 | Bryer | 369/261 |
| 4,139,876 | 2/1979 | Owens | 360/97 |
| 4,405,957 | 9/1983 | Vorbach et al. | 360/97 |
| 4,413,294 | 11/1983 | Beijer | 360/97 |
| 4,445,156 | 4/1984 | Fujimoto | 360/97 |
| 4,602,306 | 10/1982 | Noda | 360/97 |

FOREIGN PATENT DOCUMENTS

| | | | |
|---|---|---|---|
| 0160494 | 6/1985 | European Pat. Off. | 369/261 |
| 0179970 | 11/1982 | Japan | 360/97 |
| 0001868 | 1/1983 | Japan | 360/97 |
| 0090204 | 5/1984 | Japan | 369/261 |
| 0085461 | 5/1985 | Japan | 369/261 |

OTHER PUBLICATIONS

R. E. Baker and H. A. Wayne, Diskette Drive Latch Interlock and CAM Device, Feb. 1976, vol. 18, No. 9, pp. 3020 and 3021.

*Primary Examiner*—Robert S. Tupper
*Assistant Examiner*—Andrew L. Sniezek
*Attorney, Agent, or Firm*—Woodcock Washburn Kurtz Mackiewicz & Norris

[57] ABSTRACT

A data storage apparatus includes a housing having an entrance slot for the insertion and withdrawal of a record medium, such as a flexible magnetic disk cartridge, to and away from a data transfer position within the housing. A disk clamp mechanism including a rotary, flanged centering cone is mounted within the housing for clamping the loaded record medium onto a motor driven hub for joint rotation therewith. Disposed in the vicinity of the entrance slot is a disk loading handle pivotable between an open position for holding the entrance slot open and a closed position for blocking the entrance slot against the insertion or withdrawal of the record medium. The disk loading handle further functions, while being pivoted through a predetermined angle from the open toward the closed position, to push the record medium fully to the data transfer position. A lost motion linkage, including a cam mechanism, connects the disk loading handle to the disk clamp mechanism to cause the latter to clamp the record medium onto the drive hub only after the record medium has been moved fully to the data transfer position by the disk loading handle.

3 Claims, 15 Drawing Figures

2
2
4
4
13
13
10
14
20
22
26
28
30
32
34
36
38
40
42
68
70
78
80
84
86
88
90
92
94
100
102
104
106
108
110
112
114
116
118
120
122
124
126
128
130
134
136
138
140
142
144

90
22
24
16
56
64
76
74
70
20
72
68
66
58
18
106
104
108
110
112
42
102
84
92
100
40
12
14
10
62
60

DISK LOADING AND CLAMPING MECHANISM FOR A DATA TRANSFER APPARATUS

BACKGROUND OF THE INVENTION

Our invention relates to a data transfer apparatus for use with disklike record media such as, typically, a flexible magnetic disk now commonly referred to as floppy disks. More specifically our invention pertains to such an apparatus featuring provisions for loading and clamping a record medium in position therein for subsequent data transfer.

Flexible magnetic disks have found widespread acceptance in information processing and allied industries as compact data storage media. Being thin and limply flexible, the disks are usually enclosed in more rigid, apertured envelopes to make up disk assemblies or cartridges that are self supporting.

A problem has arisen in the use of such magnetic disk cartridges as each cartridge is manually inserted in the data transfer apparatus. The apparatus commonly employs a centering cone or collet movable, through the central aperture in the disk that has been loaded in the apparatus, into and out of engagement in a socket in a drive hub which is coupled to a drive motor. Thus captured between cone and hub, the disk rotates therewith for data transfer with a transducer head or heads. The disk cartridge does not, however, come to a position of exact axial alignment with the motor driven hub on being manually inserted in the apparatus through the entrance slot defined therein. If the disk is placed too much out of alignment with the drive hub, the centering cone becomes unable to center the disk, possibly pushing its inner edge portion into the hub socket and so ruining the disk.

Designed to overcome this problem is the U.S. patent application Ser. No. 434,400 filed on Oct. 14, 1982, by Noda, one of the instant inventors. That application suggested the use of a disk loading handle or knob to be manipulated for pushing the incompletely inserted disk cartridge fully into the entrance slot and for activating the centering cone into engagement in the drive hub socket through the central aperture in the disk. This device has proved to have a weakness, however. As the manipulation of the handle results in the movement of the centering cone into engagement in the drive hub socket at the same time with the pushing of the disk cartridge into the entrance slot by the handle, there has been the possibility, if all the related parts are not in good working order, of the centering cone clamping the disk before the complete loading of the cartridge in the apparatus by the handle. The centering cone may then interfere with, or even destroy, the disk cartridge being loaded.

SUMMARY OF THE INVENTION

We have hereby succeeded in eliminating the noted weakness from the prior art data transfer apparatus and make it possible to load a flexible magnetic disk cartridge or like record media in position in an associated data transfer apparatus with no likelihood whatever of the record medium being ruined on being clamped for rotation.

According to our invention, stated in brief, there is provided a data transfer apparatus comprising a housing having defined therein a disk entrance opening for the insertion and withdrawal of a disklike record medium to and away from a predetermined data transfer position within the housing. Provided within the housing are a disk drive mechanism and a disk clamp mechanism, with the latter clamping and unclamping the loaded record medium onto and from the disk drive mechanism in the data transfer position. A disk loading handle or knob is mounted to the housing for pivotal motion between an open position, where the entrance opening is held open for the insertion or withdrawal of the record medium, and a closed position where the entrance opening is substantially closed against the insertion or withdrawal of the record medium. The disk loading handle is adapted, while being pivoted through a preassigned angle from the open toward the closed position, to urge the record medium, inserted incompletely in the entrance opening, fully to the data transfer position. The mentioned preassigned angle is less than the complete angle of swing of the disk loading handle from the open to the closed position, so that the handle must be pivoted through an additional angle to reach the closed position after it has moved the record medium to the data transfer position. Also included is a lost motion linkage connecting the disk loading handle to the disk clamp mechanism for causing the latter to clamp the record medium onto the disk drive mechanism in response to the pivotal motion of the handle from the open to the closed position, and to unclamp the record medium in response to the pivotal motion of the handle from the closed to the open position. The lost motion linkage is further adapted to prevent the disk clamp mechanism from clamping the record medium while the disk loading handle is being pivoted through the noted preassigned angle from the open toward the closed position.

Thus, as the operator turns the disk loading handle from the open to the closed position after inserting the record medium in the entrance opening, the handle first acts to push the record medium fully into the apparatus while being turned through the preassigned angle. Only after the record medium has reached the data transfer position does the lost motion linkage allows the disk clamp mechanism to clamp the record medium onto the disk drive mechanism. It is therefore apparent that there is absolutely no possibility of the disk clamp mechanism interfering with the full insertion of the record medium by being prematurely activated into engagement with the disk drive mechanism. Conversely, unless properly placed in the data transfer position, the record medium cannot possibly be clamped onto the disk drive mechanism for subsequent data transfer.

The above and other features and advantages of our invention and the manner of realizing them will become more apparent, and the invention itself will be understood, from a study of the following description and appended claims, with reference had to the attached drawings showing a preferred embodiment of the invention.

DESCRIPTION OF THE PREFERRED EMBODIMENT

General

Figure 1:
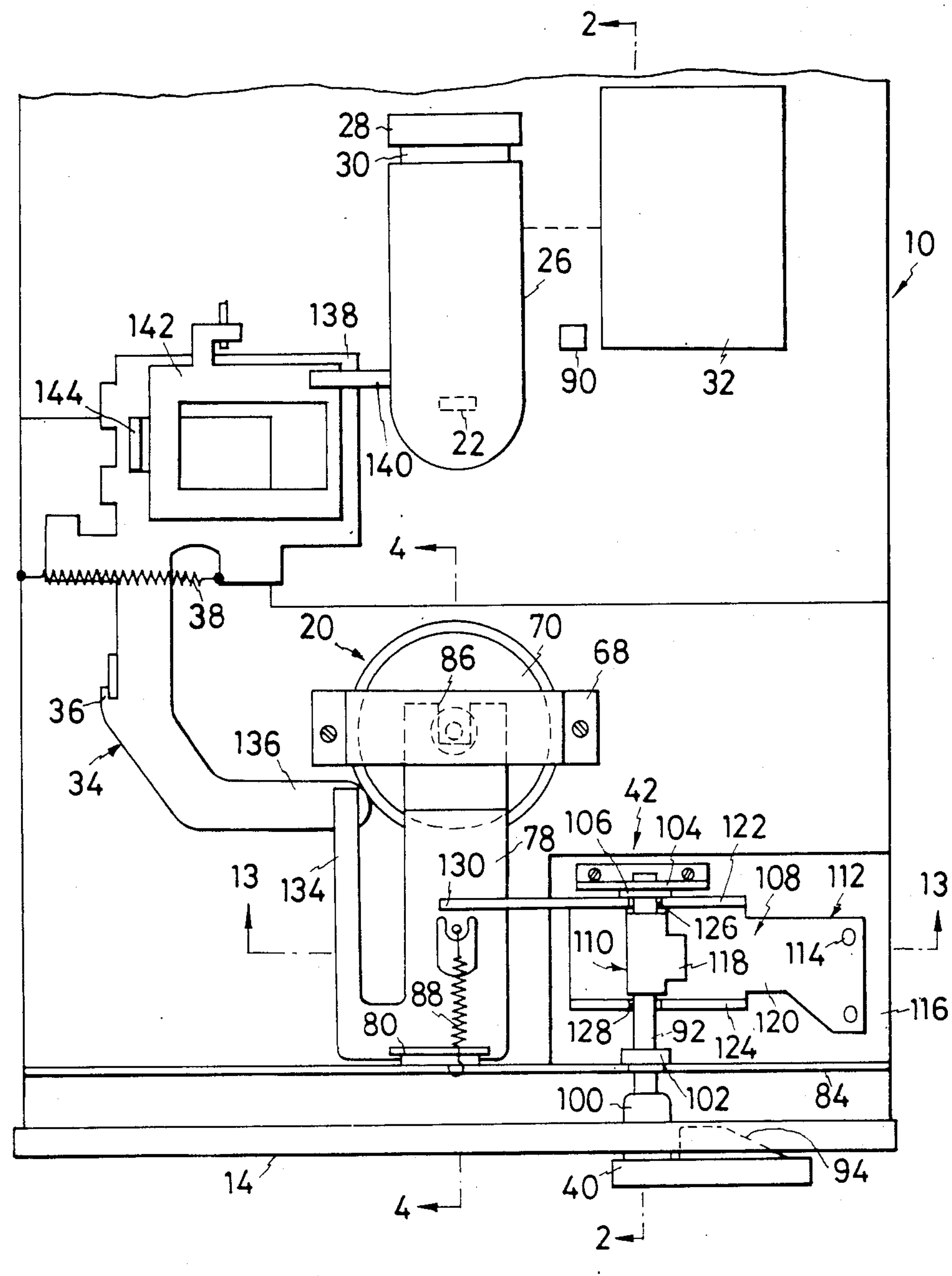
FIG. 1 is a fragmentary top plan of the data transfer apparatus constructed in accordance with the novel concepts of our invention and as adapted for use with a flexible magnetic disk cartridge, the apparatus being herein shown with the top wall of its housing removed to reveal the inner details.
Figure 2:
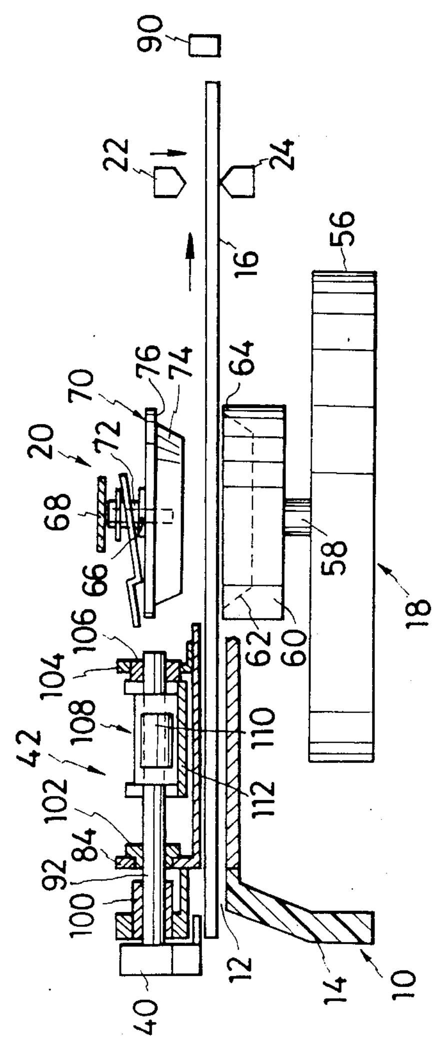
FIG. 2 is a vertical section taken along the line 2—2 of FIG. 1 and showing the inner details of the data transfer apparatus.

With reference first and in particular to FIGS. 1 and 2 the exemplified data transfer apparatus of our invention has a generally flat, boxlike housing 10 which typically may be placed in a horizontal or recumbent attitude in the use of the apparatus. As will be seen also from its front view given in FIGS. 3 and 4, the housing 10 has an entrance opening or slot 12 defined in its front face 14 for the insertion and withdrawal of a disklike record medium such as a flexible magnetic disk cartridge 16 depicted in outline in FIGS. 2 and 4 and illustrated in detail in FIG. 5.

Mounted approximately centrally within the housing 10 are a disk drive mechanism 18 and, thereover, a disk clamp mechanism 20, both best seen in FIG. 2. The clamp mechanism 20 functions to clamp the loaded magnetic disk onto the drive mechanism 18 for joint rotation therewith.

At 22 and 24 in FIG. 2 are shown a pair of transducer heads disposed on opposite sides of the disk cartridge 16 loaded in the apparatus through the entrance slot 12. As will be seen from FIG. 1, the upper transducer head 22 is conventionally gimbaled on an upper carriage 26. This upper carriage is pivotally mounted on a lower carriage 28, supporting the lower transducer head 24, via a leaf spring 30 biasing the upper carriage downwardly. A bidirectional stepping motor 32 incrementally moves the carriages 26 and 28 radially with respect to the record disk for track to track accessing. An approximately L shaped link or lever 34 controls the movement of the upper carriage 26, and therefore of the upper transducer head 22, into and out of data transfer contact with the record disk in relation to the operation of the disk clamp mechanism 20. Fulcrumed at 36, the lever 34 is biased upwardly by a helical tension spring 38, normally holding the upper transducer head 22 away from the record disk.

Figure 3:
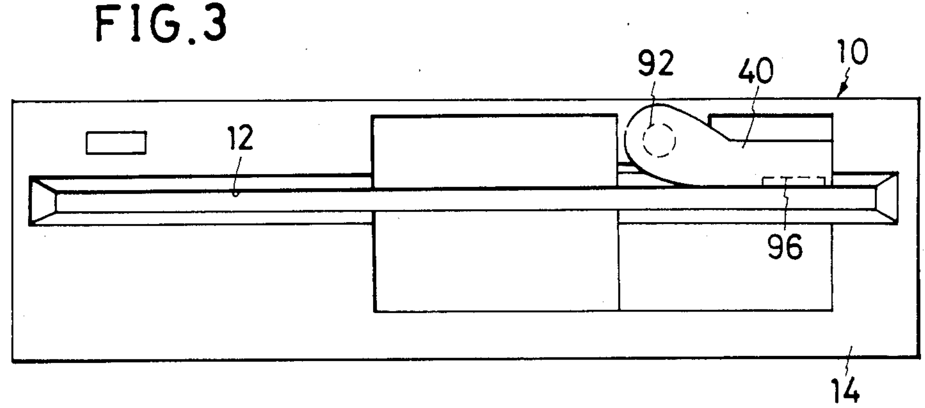
FIG. 3 is a front elevation of the data transfer apparatus, with the disk loading handle shown in the open position for the insertion of the disk cartridge.
Figure 4:
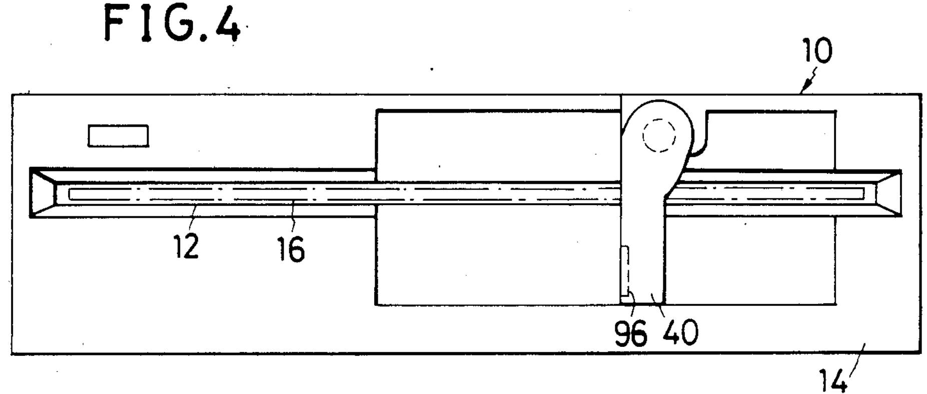
FIG. 4 is a view similar to FIG. 3 except that the disk loading handle is shown turned to the closed position following the loading of the disk cartridge.

Playing an important role in the data transfer apparatus of our invention is a disk loading handle 40 seen in both FIGS. 1 and 2 but better shown in FIGS. 3 and 4. The handle 40 is mounted to the front face 14 of the housing 10, just above the entrance slot 12 therein, for pivotal motion between an open position of FIG. 3 and a closed position of FIG. 4. The disk cartridge 16 is to be inserted in the entrance slot 12 when the handle 40 is in the open position. Upon subsequent manipulation of the handle 40 to the closed position, the disk cartridge 16 can be forced fully into the entrance slot 12 for proper data transfer with the transducer heads 22 and 24.

The reference numeral 42 in FIGS. 1 and 2 generally denotes a lost motion linkage connecting the disk loading handle 40 to the disk clamp mechanism 20. The lost motion linkage 42 functions to cause the disk clamp mechanism 20 to clamp the loaded record disk onto the disk drive mechanism 18 after the disk cartridge 16 has been pushed fully into the entrance slot 12 by the disk loading handle 40 on its clockwise turn from the FIG. 3 position to that of FIG. 4. On counterclockwise turn of the handle 40, on the other hand, the lost motion linkage 42 allows the disk clamp mechanism 20 to unclamp the record disk.

Of the above recited parts and components, those particularly important for the proper functioning of the apparatus are, as far as our invention is concerned:

1. The disk drive mechanism 18.
2. The disk clamp mechanism 20.
3. The disk loading handle 40.
4. The lost motion linkage 42.

We will discuss these more important parts or components, as well as the flexible magnetic disk cartridge 16, in greater detail hereinbelow. The description of operation will follow the detailed discussion of the listed parts or components.

Flexible Magnetic Disk Cartridge

Figure 5:
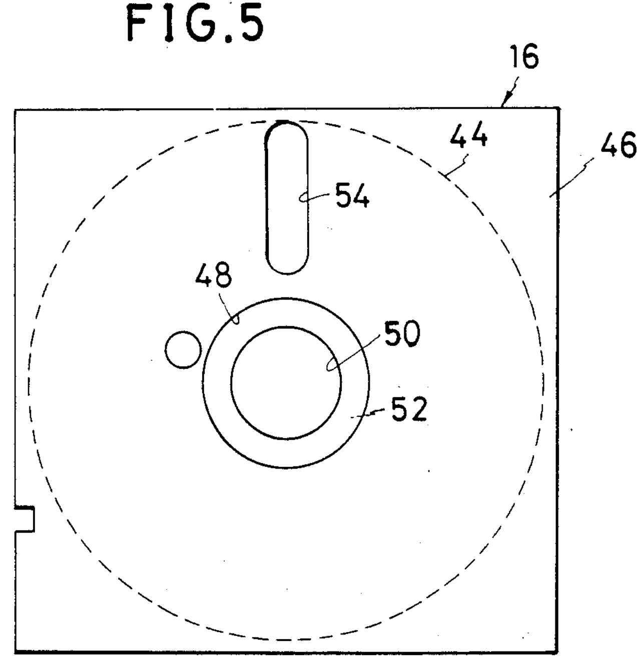
FIG. 5 is a plan view of a typical form of the flexible magnetic disk cartridge for use with the data transfer apparatus of FIG. 1.

Reference is directed to FIG. 5 for a more extensive discussion of the flexible magnetic disk cartridge 16. The cartridge has a flexible magnetic disk 44 having information bearing surfaces on both sides and contained in a sealed, square envelope 46. The envelope 46 has in its opposite surfaces a central aperture 48 larger than a concentric central aperture 50 in the disk 44, so that an annular portion 52 of the disk surrounding its central aperture 50 is exposed. This exposed portion 52 of the disk 33 is to be engaged between drive mechanism 18 and clamp mechanism 20 to cause rotation of the disk relative to the envelope 46. The envelope 46 also has in its opposite surfaces an elliptical opening 54. The consequently exposed radial portions of both surfaces of the disk 44 are intended for data transfer contact with the respective transducer heas 22 and 24.

Disk Drive Mechanism

With reference to FIG. 2 the disk drive mechanism 18 includes an electric drive motor 56 fixedly mounted within the housing 10 with its output shaft 58 directed upwardly therefrom. Coupled directly to the drive motor output shaft 58 is a rotary drive hub 60 having a frustoconical depression or socket 62 formed centrally therein so as to provide a relatively raised, annular rim 64 around the depression.

Disk Clamp Mechanism

As shown in both FIGS. 1 and 2, the disk clamp mechanism 20 includes a guide rod or pin 66 immovably bracketed at 68 to the housing 10 and depending therefrom in axial alignment with the drive mechanism 18 and at right angles with the disk cartridge 16 that has been loaded in the apparatus through the entrance slot 12. A clamp 70 having a flanged sleeve 72 is mounted on the guide rod 66 for both rotary and axial sliding motion relative to the same. The clamp 70 comprises a centering cone 74 shaped to fit in the depression 62 in the drive hub 60 of the drive mechanism 18, and an annular flange or shoulder 76 encircling the upper edge of the centering cone.

Figure 6:
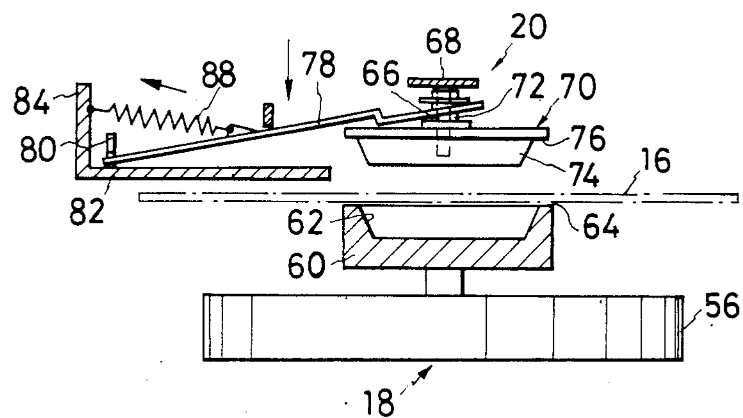
FIG. 6 is a fragmentary vertical section through the data transfer apparatus, taken along the line 4—4 in FIG. 1 and showing in particular the disk drive mechanism and the disk clamp mechanism, with the clamp mechanism being shown disengaged from the drive mechanism for unclamping the magnetic disk of the loaded cartridge.
Figure 7:
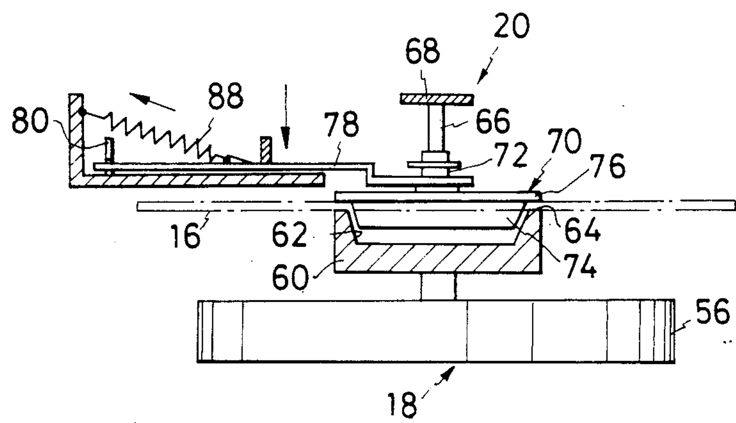
FIG. 7 is a view similar to FIG. 6 except that the disk clamp mechanism is shown actuated into engagement with the disk drive mechanism for clamping the magnetic disk therebetween.

As will be seen also from FIGS. 6 and 7, a swing arm 78 is pivotally supported at one end by an upstanding retainer 80 on a mounting plate 82 having a portion 84 bent upwardly just behind the front face 14 of the housing 10. In the form of a strip of sheet metal having only slight resiliency, the swing arm 78 has a recess 86, FIG. 1, cut in its free end for operative engagement with the flanged sleeve 72 integral with the clamp 70. A helical tension spring 88 extends between the swing arm 78 and the upstanding portion 84 of the mounting plate 82 to bias the swing arm in a counterclockwise direction as viewed in FIGS. 6 and 7. The swing arm 78 might be considered a part of the lost motion linkage 42.

Normally, therefore, the clamp 70 is held raised as in FIGS. 2 and 6 under the bias of the tension spring 88 and so is out of engagement with the drive hub 60 of the drive mechanism 18. The disk cartridge 16 is to be inserted in the entrance slot 12 into abutment against a stop 90, FIGS. 1 and 2, while the clamp 70 is held raised as above. Then the swing arm 78 is to be turned clockwise against the bias of the tension spring 88 by the disk loading handle 40 via the lost motion linkage 42, in a manner yet to be described, to cause the descent of the clamp 70 into engagement with the drive hub 60 as in FIG. 7. Upon descent of the clamp 70 its centering cone 74 becomes received in the depression 62 in the drive hub 60 through the central aperture 50 in the magnetic disk 44. Further the disk 44 has its exposed annular portion 52 firmly engaged between the flange 76 of the cone 74 and the rim 64 of the drive hub 60 for joint rotation with the hub and cone.

The position where the loaded disk cartridge 16 butts on the stop 90 is what we call the data transfer position. The disk cartridge 16 will reach the data transfer position if manually inserted fully in the entrance slot 12. The aforementioned problem has heretofore existed as the disk cartridge may not be fully inserted in the entrance slot. How we have remedied this problem will become apparent as the description progresses.

Disk Loading Handle

The disk loading handle 40 appears in all of FIGS. 1 through 4. The handle 40 takes the form of a lever in the illustrated embodiment, disposed on the front face 14 of the housing 10 and in the immediate vicinity of the entrance slot 12. One end of the handle 40 is rigidly affixed to a rotatable shaft 92 mounted to the housing 10 and extending in the direction in which the disk cartridge 16 is inserted into and withdrawn from the housing through the entrance slot 12. The handle 40 is pivotable through a first preassigned angle of approximately 90 degrees between the open position of FIG. 3, where the entrance slot 12 is held open for the insertion or withdrawal of the disk cartridge 12 into and out of the housing 10, and the closed position of FIG. 4 where the handle extends across the entrance slot to block the same against the insertion or withdrawal of the disk cartridge.

Figure 8:
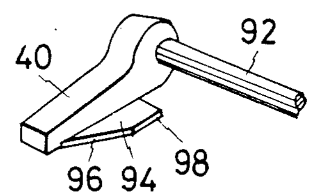
FIG. 8 is a perspective view of the disk loading handle of the data transfer apparatus of FIG. 1.
Figure 11:
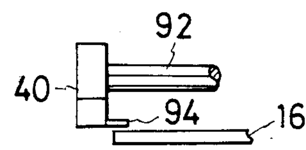
FIG. 11 is a fragmentary elevation also explanatory of the way the disk loading handle pushes the disk cartridge into the apparatus, with the handle being herein shown in the open position, ready to push the cartridge that has been inserted incompletely in the apparatus.

As best pictured in FIG. 8, the handle 40 has a pusher blade 94 projecting rearwardly therefrom and generally extending longitudinally of the handle. The pusher blade 94 has a first edge 96 disposed adjacent the free end of the handle 40 and extending at an angle to the plane of the pivotal motion of the handle, and a second edge 98 disposed farther away from the free end of the handle and extending parallel to the plane of the pivotal motion of the handle. The first 96 and second 98 edges of the pusher blade 94 have their own functions set forth hereafter.

Figure 12:
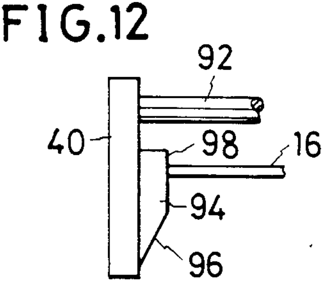
FIG. 12 is a view similar to FIG. 11 except that the disk loading handle is shown turned fully to the closed position.
Figure 10:
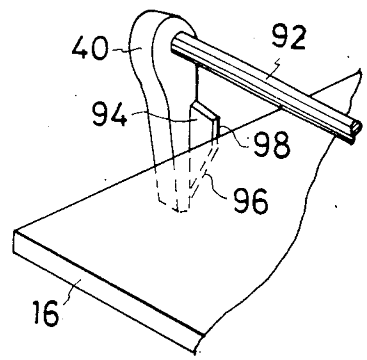
FIG. 10 is a view similar to FIG. 9 except that the disk loading handle is shown turned fully to the closed position.

FIGS. 3 and 4 indicate by the dashed lines the angular positions of the sloping first edges 96 of the pusher blade 94 with respect to the entrance slot 12 when the handle 40 is in the open and closed positions, respectively. The sloping first edge 96 lies immediately above the entrance slot 12, extending parallel to the same, when the handle 40 is in the open position as in FIG. 3. As the handle 40 is turned from the open toward the closed position, the sloping first edge 96 immediately starts crossing the entrance slot 12 and completes crossing the same when the handle is turned through a second preassigned angle of, say, 30 degrees from the open position. Therefore, as will be seen also from FIGS. 9 through 12, if the disk cartridge 16 has been inserted incompeltely in the entrance slot 12 while the handle 40 is in the open position, the sloping first edge 96 pushes this disk cartridge fully to the data transfer position during the initial 30 degrees turn of the handle 40 from the open toward the closed position. Thereafter the nonsloping second edge 98 of the pusher blade 94 takes over and positively retains the disk cartridge 16 in the data transfer position. It will be observed from FIGS. 10 and 12 that the second edge 98 remains held against the disk cartridge 16 even when the handle 40 reaches the closed position.

Lost Motion Linkage

As we have stated, the lost motion linkage 42 seen in FIGS. 1 and 2 connects the disk loading handle 40 to the disk clamp mechanism 20 and functions to cause the clamp mechanism to clamp and unclamp the disk cartridge 16 in response to the pivotal motion of the handle between the open and closed positions.

Constituting a part of the lost motion linkage 42 is the aforesaid rotatable shaft 92 having the disk loading handle 40 rigidly attached thereto. This shaft rotatably extends through the front face 14 of the housing 10 via a sleeve bearing 100, through the upstanding portion 84 of the mounting plate 82 via another bearing 102, and through another similar upstanding wall 104 via still another bearing 106. The rotatable shaft 92 is suitably locked against axial displacement.

An important component of the lost motion linkage 42 is a cam mechanism 108 acting between rotatable shaft 92 and swing arm 78. As shown also in FIGS. 13 and 14, the cam mechanism 108 comprises a cam 110 nonrotatably mounted on the shaft 92, and a cam follower lever 112 extending across the shaft 92 and fulcrumed at 114 on a fixed mounting plate 116 disposed on a lower level than the first recited mounting plate 82. The cam 110 takes the form of a cylinder coaxially mounted on the shaft 92 and having a lobe 118. The cam follower lever 112 includes a relatively broad web 120 having a pair of upstanding flanges 122 and 124 on its opposite sides. The flanges 122 and 124 are recessed at 126 and 128, respectively, to accommodate the shaft 92, which thus serves the additional purpose of restraining the cam follower lever 112 from longitudinal displacement. The flange 122 has an extension 130 resting on the swing arm 78, with the result that the web 120 of the cam follower lever 112 is held against the cam 110. The flange extension 130 is to serve as a load arm for acting on the swing arm 78 in response to the angular displacement of the cam 110.

Figure 13:
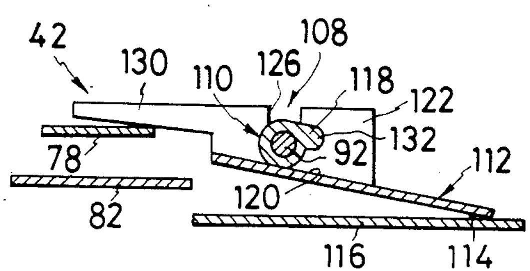
FIG. 13 is a fragmentary vertical section through the data transfer apparatus, taken along the line 13—13 in FIG. 1 and showing the lost motion linkage in its state when the disk loading handle is in the open position as in FIG. 3.
Figure 14:
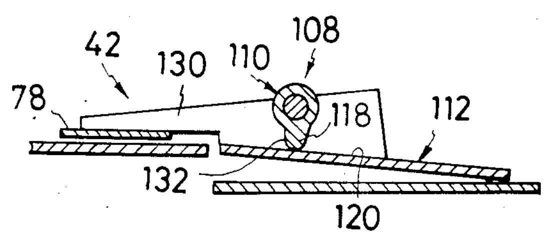
FIG. 14 is a view similar to FIG. 13 except that the lost motion linkage is shown in the state when the disk loading handle is in the closed position as in FIG. 4.
Figure 9:
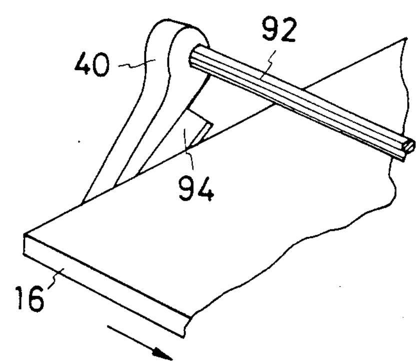
FIG. 9 is a fragmentary perspective view explanatory of the way the disk loading handle pushes the disk cartridge into the apparatus, with the handle being shown midway between its open and closed positions.

FIG. 13 indicates the angular position of the cam lobe 118 on the shaft 92 when the disk loading handle 40 is in the open position of FIG. 3, and FIG. 14 indicates the angular position of the cam lobe when the handle is in the closed position of FIG. 4. When the handle 40 is in the open position, the apex 132 of the cam lobe 118 is angularly displaced 90 degrees in a counterclockwise direction from the point of contact of the cam 110 with the web 120 of the cam follower lever 112. The cam lobe 118 starts lowering the cam follower lever 112, and in consequence the swing arm 78, when the handle 40 is turned 30 degrees from the open toward the closed position. When the handle 40 reaches the closed position, the apex 132 of the cam lobe 118 becomes held against the cam follower lever 112 as in FIG. 14, holding the same, and therefore the swing arm 78, in the lowermost position.

With reference again to FIG. 1 the swing arm 78 has a branch arm 134 formed in one piece therewith and extending parallel thereto. Proximally joined to the swing arm 78, the branch arm 134 has its distal end held against the end 136 of the aforesaid L shaped lever 34. This lever has a portion 138 underlying a stay 140 extending laterally from the upper carriage 26.

As the swing arm 78 is depressed by the cam follower lever 112 as above, so is the branch arm 134, which in turn pivots the lever 34 downwardly about its fulcrum at 36 against the force of the tension spring 38. Thus lowered, the portion 138 of the lever 34 allows the upper carriage 26 to pivot downwardly under the bias of the leaf spring 30, with the consequent movement of the upper transducer head 22 into data transfer contact with one surface of the magnetic disk 44. The lower transducer head 24 also makes proper contact with the other surface of the disk 44.

In the preceding paragraph we have disregarded the presence of a head control member 142 pivotally supported at 144 on the portion 138 of the lever 34. Interposed between lever portion 138 and upper carriage stay 140, the head control member 142 is to be solenoid actuated to raise the upper carriage 26 and hence to hold the upper transducer head 22 out of contact with the magnetic disk 44, in the face of the descent of the lever portion 138 as a result of the manipulation of the disk loading handle 40 from the open to the closed position.

Operation

The disk loading handle 40 must be held in the open position of FIG. 3 for loading the disk cartridge 16 in this data transfer apparatus. With the handle 40 in the open position, the cam mechanism 108 is in the state of FIG. 13, and the clamp mechanism 20 in the state of FIG. 6. The user may now insert the disk cartridge 16 in the entrance slot 12 and then turn the disk loading handle 40 from the open toward the closed position of FIG. 4.

What happens in the apparatus upon manipulation of the disk loading handle 40 toward the closed position differs depending upon the extent to which the user has pushed the disk cartridge 16 into the entrance slot 2. If he has fully inserted the cartridge into abutment against the stop 90, the handle 40 with its pusher blade 94 will serve no purpose other than that of actuating the clamp mechanism 20 via the lost motion linkage 42 to clamp the magnetic disk 44 of the loaded cartridge onto the drive hub 60 of the drive mechanism 18.

The handle 40 with the pusher blade 94 does serve additional purposes when the user incompletely inserts the disk cartridge 16 in the entrance slot 12. If the insertion of the cartridge is too incomplete, the handle 40 on its way from the open toward the closed position will hit the cartridge and so lock against further turn. The user can then discern that he has incompletely inserted the cartridge. He may then proceed to reinsert the cartridge to such an extent that the handle 40 can be turned fully to the closed position.

The cartridge will be pushed fully to the data transfer position upon manipulation of the handle 40 from the open to the closed position if it has been initially inserted incompletely only to such an extent that the sloping first edge 96 of the pusher blade 94 will engage the trailing edge of the cartridge upon subsequent revolution of the handle. As will be seen from FIGS. 9 through 12, the sloping edge 96 of the pusher blade will then slide over the trailing edge of the incompletely inserted cartridge and so will push the same to the data transfer position. The sloping edge 96 starts crossing the entrance slot 12 immediately upon turn of the handle 40 from the open toward the closed position and completes crossing the entrance slot when the handle is turned 30 degrees from the closed position. The cartridge is pushed to the data transfer position during this 30 degrees turn of the handle. Thereafter the nonsloping second edge 98 of the pusher blade 94 holds the cartridge against displacement in the direction of withdrawal from the apparatus.

With the turn of the handle 40 from the open to the closed position, the cam 110 of the lost motion linkage 42 revolves from its FIG. 13 position to that of FIG. 14. The cam follower lever 112 is held against the contoured surface of the cam 110 under the influence of the tension spring 88, FIGS. 1, 6 and 7, acting to normally hold the clamp mechanism 20 in the state of FIG. 6. The lobe 118 of the cam 110 is so positioned on the handle shaft 92 that the cam follower lever 112 remains stationary during the initial 30 degrees turn of the handle 40 from the open toward the closed position. Consequently the clamp mechanism 20 remains in the state of FIG. 6, with the clamp 70 held out of engagement with the drive hub 60.

It will be recalled that the pusher blade 94 on the handle 40 completes the pushing of the disk cartridge 16 to the data transfer position during the initial 30 degrees turn of the handle. Being held in the FIG. 6 position during this period, the clamp 70 will not in any way interfere with the disk cartridge 16 being pushed to the data transfer position.

The cam lobe 118 starts acting on the cam follower lever 112 after the initial 30 degrees turn of the handle, pivoting the cam follower lever in a counterclockwise direction, as viewed in FIGS. 13 and 14, about its fulcrum at 114 against the force of the tension spring 88. Thereupon the flange extension 130 of the cam follower lever 112 turns the swing arm 78 downwardly, or in a clockwise direction as seen in FIGS. 6 and 7, about its fulcrum at 80. The result is the descent of the clamp 70 of the clamp mechanism 20 along the guide rod 66. The centering cone 74 of the descending clamp 70 passes through the central aperture 50 of the magnetic disk 44 into the depression 62 in the drive hub 60, as illustrated in FIG. 7, thereby centering the disk with respect to the drive mechanism 18. Further the flange 76 of the clamp 70 positively engages the exposed annular portion 52 of the disk 44 between itself and the annular rim 64 of the drive hub 60. The clamping of the disk 44 is now completed. The centering cone 74 will not force the exposed portion 52 of the disk 44 into the drive hub depression 62 since the disk cartridge 16 has been forced fully to the data transfer position during the initial 30 degrees turn of the handle 40.

As handle 40 is turned 90 degrees to the closed position of FIG. 4, the cam 110 reaches the FIG. 14 position, with the apex 132 of the cam lobe 118 held against the cam follower lever 112. The swing arm 78 is slightly resilient as aforesaid. Accordingly, after the clamping of the disk 44, the handle 40 may be turned further by taking advantage of the elastic deformation of the swing arm 78, to such an extent that the cam 110 will not revolve counterclockwise from its FIG. 14 position by the force of the tension spring 88.

For unclamping the magnetic disk 44 the handle 40 may be turned counterclockwise from its closed position of FIG. 4 back to the open position of FIG. 3. As the cam 110 also revolves counterclockwise from its FIG. 14 position back to the FIG. 13 position, the swing arm 78 will pivot counterclockwise from its FIG. 7 to FIG. 6 position under the bias of the tension spring 88. The clamp 70 will then be raised out of engagement with the drive hub 60.

We have thus attained the objective of loading the flexible magnetic disk cartridge 16, or any other essentially equivalent record medium, in position in the data transfer apparatus without the possibility of the record medium being ruined on being engaged between drive hub 60 and clamp 70. Employed for the attainment of this objective is the lost motion linkage 42 which is so simple in construction that it can be compactly mounted in the data transfer apparatus without any substantial alteration of the existing parts. It will also be appreciated that, merely by giving slight resiliency to the swing arm 78, we have succeeded in positively holding the record medium clamped despite the force of the tension spring 88 biasing the clamp 70 out of engagement with the drive hub 60.

Alternative Form

Figure 15:
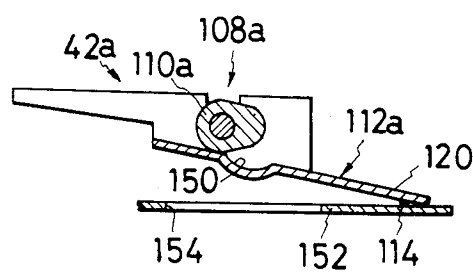
FIG. 15 is a view corresponding to FIG. 13 but showing a modification of the lost motion linkage.

Shown in FIG. 15 is a modified lost motion linkage *42a* featuring a modified cam mechanism *108a*. The modified cam mechanism has a cam *110a* contoured as shown, and a cam follower lever *112a* having a concavity 150 formed in its web 120. Thus, as the disk loading handle 40 is turned from the open toward the closed position, the lobe of the cam *110a* becomes first engaged in the concavity 150 to hold the cam follower lever *112a*, and therefore the clamp mechanism, unactivated while the pusher blade on the handle is acting to push the disk cartridge fully into the entrance slot.

The arrangement of FIG. 15 also differs from the first described embodiment in having but one mounting plate 152, instead of the two mounting plates 82 and 116 disposed at different heights in the preceding embodiment, one for supporting the swing arm 66 as in FIGS. 6 and 7 and the other for supporting the cam follower lever 112 as in FIGS. 13 and 14. The single mounting plate 152, on which the modified cam follower lever *112a* is fulcrumed at 114, is apertured at 154 to accommodate the downward protuberance of the cam follower lever web 120 created by the concavity 150.

Although we have shown and described our invention in terms of but one embodiment and a slight modification thereof, we recognize that our invention is susceptible to a variety of additional modifications within the broad teaching hereof. For example, as a further modification of the cam mechanism included in the lost motion linkage, a simple projection may be formed on the handle shaft, and the cam follower lever may be contoured to avoid actuation of the clamp mechanism while the sloping first edge of the pusher blade on the disk loading handle is acting to push the record medium fully into the apparatus. Further the inventive concepts may be applied to apparatus of the type disclosed in the aforementioned Noda U.S. patent application Ser. No. 434,400. It is of course understood, moreover, that the pusher blade need not complete the pushing of the record medium during the initial 30 degrees turn of the handle, all that is required being that the record medium be correctly placed in the data transfer position before being clamped.

What we claim is:

1. A data transfer apparatus for use with a flexible magnetic disk or similar disklike record medium, comprising:

(a) a housing having defined therein an entrance opening for the insertion and withdrawal of the record medium to and away from a predetermined data transfer position within the housing;

(b) a disk drive mechanism within the housing for imparting rotation to the record medium in the data transfer position;

(c) a disk loading handle mounted to the housing in the adjacency of the entrance opening therein for pivotal motion through a first preassigned angle between an open position, where the entrance opening is held open to allow the insertion and withdrawal of the record medium into and from the housing, and a closed position where the entrance opening is substantially closed against the insertion and withdrawal of the record medium, the disk loading handle being effective, while being pivoted through a second preassigned angle from the open toward the closed position, to force the record medium fully to the data transfer position in cases where the record medium has been inserted incompletely in the entrance opening, the second preassigned angle being less than the first preassigned angle so that the disk loading handle is further pivoted through an additional angle to the closed position after it has forced the record medium fully to the data transfer position; and (d) a disk clamp mechanism for clamping and unclamping the record medium onto and from the disk drive mechanism in the data transfer position, the record medium being rotated by the disk drive mechanism when clamped thereto by the disk clamp mechanism, said disk clamp mechanism comprising:

a guide rod fixedly mounted within the housing and extending normal to the record medium in the data transfer position;

a clamp mounted on the guide rod for both rotary and axial motion relative to the same, the clamp being movable axially toward and away from the disk drive mechanism for clamping and unclamping the record medium and being further capable, upon clamping of the record medium onto the disk drive mechanism, of joint rotation with the record medium and the disk drive mechanism;

resilient means biasing the clamp away from the disk drive mechanism; and a swing arm;

(e) a lost motion linkage connecting the disk loading handle to the disk clamp mechanism for causing the latter to clamp the record medium onto the disk drive mechanism when the disk loading handle is pivoted from the open to the closed position, and to unclamp the record medium when the disk loading handle is pivoted from the closed to the open position, the lost motion linkage being adapted to prevent the disk means from clamping the record medium while the disk loading handle is being pivoted through the second preassigned angle from the open toward the closed position, said lost motion linkage comprising:

a rotatable shaft mounted to the housing and having the disk loading handle nonrotatably mounted thereto, the rotatable shaft being capable of rotation relative to the housing upon pivotal motion of the disk loading handle;

a cam nonrotatably mounted on the rotatable shaft; and a cam follower lever pivotally supported within the housing and adapted to be acted upon by the cam when the disk loading handle is being pivoted through the additional angle from the open to the closed position after having pushed the record medium fully to the data transfer position, the cam follower lever pivoting when acted upon by the cam for causing the disk clamp mechanism to clamp the record medium onto the disk drive mechanism;

said swing arm pivotally supported at one end with the housing and having another end operatively engaged with the clamp for moving the same axially of the guide rod, the swing arm being acted upon by the cam follower lever of the lost motion linkage for moving the clamp toward the disk drive mechanism against the force of the resilient means;

(f) whereby the record medium is clamped by the disk clamp mechanism onto the disk drive mechanism only after having been moved fully to the data transfer position by the disk loading handle as the latter is pivoted from the open to the closed position.

2. The data transfer apparatus of claim 1 wherein the record medium is enclosed in an envelope having a central aperture larger than a concentric central aperture in the record medium, so that an annular portion of the record medium surrounding the central aperture therein is exposed, wherein the disk drive mechanism comprises a rotary drive hub having a depression formed centrally therein, and wherein the clamp of the disk clamp mechanism comprises:

(a) a centering cone movable into and out of close engagement in the depression in the drive hub through the central aperture in the record medium and being effective to center the record medium relative to the drive hub; and (b) a flange formed adjacent the centering cone for engaging the exposed annular portion of the record medium between itself and the drive hub when the centering cone is engaged in the depression in the drive hub.

3. The data transfer apparatus of claim 1 wherein the swing arm has a prescribed degree of resiliency.

* * * * *